(12) United States Patent
Sauer

(10) Patent No.: US 11,829,313 B2
(45) Date of Patent: Nov. 28, 2023

(54) AUTO-ADDRESSING WITH POSITION DETERMINATION OF BUS SUBSCRIBERS

(71) Applicant: ebm-papst Mulfingen GmbH & Co. KG, Mulfingen (DE)

(72) Inventor: Thomas Sauer, Bad Mergentheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 85 days.

(21) Appl. No.: 16/977,455

(22) PCT Filed: May 14, 2019

(86) PCT No.: PCT/EP2019/062385
§ 371 (c)(1),
(2) Date: Sep. 1, 2020

(87) PCT Pub. No.: WO2019/228793
PCT Pub. Date: Dec. 5, 2019

(65) Prior Publication Data
US 2020/0401543 A1   Dec. 24, 2020

(30) Foreign Application Priority Data
May 29, 2018   (DE) .......................... 102018112873.8

(51) Int. Cl.
*G06F 3/00* (2006.01)
*G06F 13/40* (2006.01)
*G05B 19/042* (2006.01)

(52) U.S. Cl.
CPC ....... *G06F 13/404* (2013.01); *G05B 19/0423* (2013.01); *G05B 2219/21028* (2013.01);
(Continued)

(58) Field of Classification Search
None
See application file for complete search history.

(56) References Cited

U.S. PATENT DOCUMENTS 6,188,189 B1 * 2/2001 Blake .................... F04D 27/004
318/471
7,336,941 B1    2/2008 Clingerman et al.
(Continued)

FOREIGN PATENT DOCUMENTS

CN       1906549 A    1/2007
CN     106550057 A    3/2017
(Continued)

OTHER PUBLICATIONS

German Search Report dated May 15, 2019.
(Continued)

*Primary Examiner* — Henry Tsai
*Assistant Examiner* — Dean Phan
(74) *Attorney, Agent, or Firm* — Dickinson Wright PLLC

(57) ABSTRACT

A position-sensing method and device for sensing the installation location (F1, . . . , Fi) of slave units (SE1, . . . , SEi) in an operating region (A1, . . . , Ai) of a system (A) comprising a number i of adjacent operating regions (A1, . . . , Ai) each having a slave unit, wherein the individual slave units (SE1, SEi) have a changeable operating function for achieving or changing the physical state in the operating region in question of the system, and wherein a respective sensor (S1, . . . , Si) is provided in each operating region in question in order to sense a measurement variable (T) proportional to the physical state in the operating region in question and an evaluating device is provided in order to determine, upon the activation or changing of the operating function of at least one slave unit (SE1, . . . , SEi), the installation location (F1, . . . , Fi) of said slave unit from the change in the measurement variables (T) over time.

13 Claims, 2 Drawing Sheets

(52) U.S. Cl.
    CPC .............. *G05B 2219/25096* (2013.01); *G06F 2213/0052* (2013.01)

(56) References Cited

U.S. PATENT DOCUMENTS

| | | | |
|---|---|---|---|
| 2002/0121555 A1* | 9/2002 | Cipolla | ............. G06F 15/17381 |
| | | | 236/49.1 |
| 2002/0161456 A1 | 10/2002 | Mayer | |
| 2010/0299401 A1* | 11/2010 | Lloyd | ............... H04L 12/40117 |
| | | | 709/209 |
| 2016/0291919 A1* | 10/2016 | Kurota | ................. H04N 9/3147 |
| 2017/0365893 A1* | 12/2017 | Kim | .................... H01M 10/633 |
| 2018/0088610 A1* | 3/2018 | Lee | .................... G05D 23/1951 |

FOREIGN PATENT DOCUMENTS

| | | |
|---|---|---|
| CN | 206402270 U | 8/2017 |
| DE | 10350591 A1 | 12/2004 |
| WO | 2015062731 A1 | 5/2015 |

OTHER PUBLICATIONS

International Search Report and Written Opinion dated Aug. 22, 2019.
Search Report dated Apr. 20, 2023.

\* cited by examiner

AUTO-ADDRESSING WITH POSITION DETERMINATION OF BUS SUBSCRIBERS

RELATED APPLICATIONS

This application claims priority to German Patent Application No. 10 2018 112 873.8, filed May 29, 2018, and PCT/EP2019/062385, filed May 14, 2019, the entire contents of which are incorporated herein by reference in their entirety.

FIELD

The disclosure relates to a method for exact position determination of individual bus subscribers or slave units in a system comprising multiple such subscribers or units which are in particular used next to one another in common or separate functional regions.

BACKGROUND

An underlying object of the present disclosure can be represented based on the example explained below. A refrigerated display case in the supermarket typically consists of multiple cooling segments the number of which depends on the length of the refrigerated display case or freezer. Typically, in each segment, a temperature sensor is located for monitoring the temperature in this cooling segment, for example, for the legally prescribed logging of the cooling temperature or else for controlling the cooling capacity in this segment.

In the delivery state, all the fans in the respective cooling segments have the address "1" and they each have to be addressed separately so that they can be addressed individually later during operation. In order then to be able to address the fans individually, a known auto-addressing algorithm can be used.

Various methods exist in the prior art for address allocation in a network, such as, for example, manual IP address allocation in networking devices (computers, printers, etc.), serial number-based auto-addressing, address allocation according to a given cable plan or a shift register address allocation. DE 103 36 301 A1, for example, proposes an automated addressing process. From EP 2 287 689 EP, a bus-based method for addressing slave units is known.

Furthermore, methods are known in the prior art wherein the allocation of an address to the unit in question (slave unit) occurs based on the serial number of the unit. Furthermore, in the prior art, corresponding algorithms for implementing the serial number-based address allocation in a simple manner are known. After the completion of the address allocation process, the fans can be addressed separately and individually by a control.

BRIEF SUMMARY

We have discovered that the problem the above method is that this leaves it unclear which slave unit (here a fan) is arranged in which position. In the present example, this means that, even if the address of the fans is known, it remains unclear in which exact position in the cooling system, i.e., in which cooling segment the corresponding fan is located. This problem also arises in other applications in which multiple fans or slave units have to be addressed.

In this light, one aim of the present disclosure is to overcome the aforementioned disadvantages and to provide a method making it possible to determine the position of multiple slave units in a system region in a simple, cost effective and reliable manner.

This aim is achieved by a method having the features of Claim 1.

A basic idea of the present invention is to determine the position of the slave unit in question by the technical effect associated with the slave unit by means of indirect information retrieval. If, as in the present example, the aim of the slave unit consists of the cooling function or of a function supporting the cooling function, then, with the aid of a sensor system which determines the effect of the function to be achieved and whose installation location is known, by means of this secondary information, a conclusion can be drawn on the exact position of the slave unit.

Then, by means of an iterative process, starting with the first slave unit, the respective position of all the other slave units can be determined successively. The position of a fan in a determined cooling segment of the cooling system can be determined in that first only the fan and the cooling circuit with the first address are operated, and all the other fans remain inoperative. In this case, only the sensor (for example, a temperature sensor) arranged in the corresponding segment will sense a clearly greater change in temperature in comparison to the sensors in the other cooling segments. If the respective built-in sensors are assigned in a dedicated manner to the individual cooling segments, the position of the associated fan can be derived from the change behavior (gradient) of the measurement curve of the respective measurement variable.

This position-sensing process is carried out stepwise for the other addresses or fans (generally slave units) present, until the positions of all the slave units are known.

Alternatively, more complex algorithms can also be used, which, for example, operate multiple fans at once and which require a minimum number of tests, for example, by DOE, in order to unequivocally determine all the positions.

The indirect variable intended for the position sensing can be determined here via a sensor or else via the whole system behavior; for example, it is possible to use the presence of moving air, or else the switching off of a compression cooling subsystem which experiences a system malfunction on the condenser or evaporator due to an unactivated fan.

For this purpose, according to the present disclosure, a method is proposed for sensing the position of the installation location of slave units in an operating region of a system comprising a number i of adjacent operating regions each having a slave unit, wherein each operating region during operation of the system should have a respective predetermined physical state, for the purpose of which the individual slave units have an operating function for achieving or changing the physical state in the operating region in question of the system or provide said function for this purpose, and wherein a respective sensor is provided in the operating region in question in order to sense a measurement variable proportional to the physical state, having the following steps:

a. allocating or determining of the network address of at least one slave unit by means of an auto-addressing method (preferably of a serial number-based addressing method);

b. activating or changing of the operating function of this respective slave unit in order to achieve or change the physical state in the operating region in question;

c. sensing of a detectable physical state change in the operating unit(s) by measuring the respective measurement variables corresponding to the respective state and in particular as a function of time by means of the sensors;

d. associating of the sensed installation location from a number of installation locations present from the measurement variable(s), in particular from the measurement variable with the greatest measured change, with the network address of the activated slave unit.

In an advantageous embodiment of the present disclosure, it is provided that the above-mentioned steps a) to d) are repeated successively, until all the installation locations and thus all the operating regions of the slave units are associated with the respective network addresses of these slave units.

It is also advantageous if, in the successive allocation of the network addresses, the network address allocation of the respective next slave unit is increased in each case by the factor "1," preferably starting with N1=1 to Ni=i.

Furthermore, it is advantageously provided that an identification of each slave unit also occurs via a data allocation table containing the individual serial number of each slave unit and the network address assigned to this serial number. If, in step a), no network address is present, then, by means of an addressing method, in accordance with a stored tuple, an addressing can occur, so that the slave unit in question receives a unique address.

Depending on the application, the slave units can be, for example, fans, preferably fans with adjustable rotational speed.

Moreover, it can be advantageously provided that, before the above-mentioned step b), all the slave units are first activated in order to achieve a determined physical state in the operating regions of the system, in particular a state in a thermodynamic equilibrium. For this purpose, using the example of a cooling system with different cooling regions as operating regions, the cooling system is started, and the fans are all operated at the same rotational speed in order to set the desired temperature in the individual cooling regions.

In an additional step, it is provided according to the present disclosure that, after a determined state or the thermodynamic equilibrium has been reached, the respective measurement variables sensed by the sensors (for example, the temperatures in the different cooling regions) are stored in a memory.

In a possible embodiment of the present disclosure, it is provided that, before step b), after reaching a determined state or the thermodynamic equilibrium in the multiple operating regions (for example, cooling regions) of the system, the operating function of the respective slave unit (for example, the rotational speed of the fan in question) the installation location of which is to be determined is deactivated again or changed.

In an alternative embodiment of the present disclosure, it is provided that, before step b), after reaching a determined physical state or the thermodynamic equilibrium in the respective operating regions of the system, all the slave units (for example all the fans), except for the slave unit (the fan) the installation location of which is to be determined, are deactivated again. Since there is a known number of installation locations present, at which the fans or slave units can be located, it is also possible to representatively use for each installation location a position number representing the installation location or position information such as, for example, POS1, Pos2, . . . Posi.

Advantageously, it is provided that the measurement variable for sensing the physical state, in particular the thermal state, in the operating region in question of the system, is the temperature, and that the sensors are designed accordingly for sensing the temperature.

An additional aspect of the present disclosure relates to a position-sensing device for sensing the installation location of slave units in an operating region of a system comprising a number i of adjacent operating regions each having a slave unit, wherein the individual slave units have a changeable operating function for achieving or changing the physical state in the operating region in question of the system, and wherein a respective sensor is provided in the operating region in question in order to sense a measurement variable proportional to the physical state in the operating region in question, and a sensing device is provided in order to determine, upon the activation or changing of the operating function of at least one slave unit, from the change of the measurement variables over time, the installation location of this slave unit.

BRIEF DESCRIPTION OF THE DRAWINGS

Other advantageous developments of the invention are characterized in the dependent claims and represented in further detail below together with the description of the preferred design of the invention in reference to the figures.

In the drawings.

DETAILED DESCRIPTION

Figure 1:
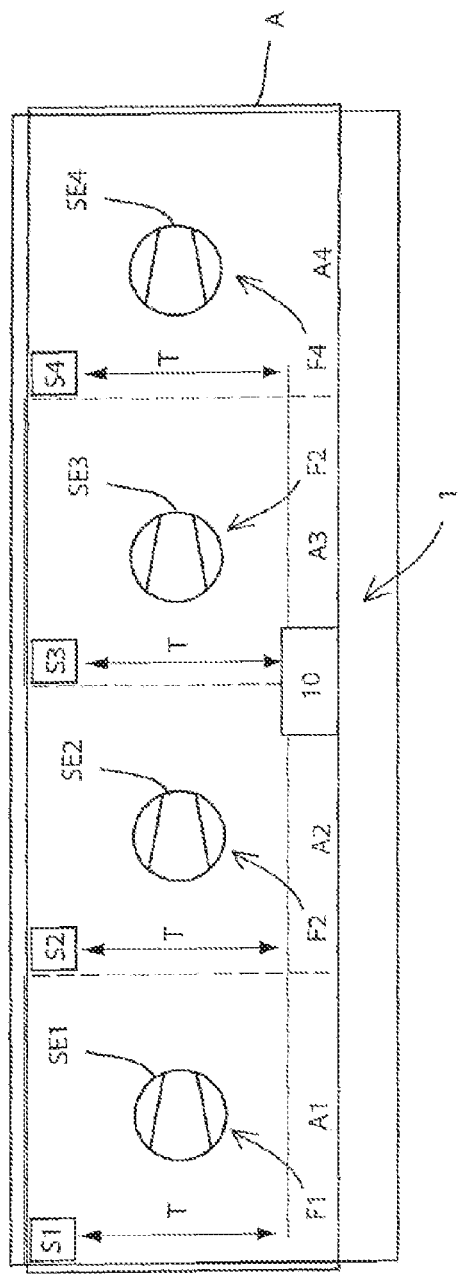
FIG. 1 shows a diagrammatic representation of a position-sensing device according to the invention.

Below, the present disclosure is explained in further detail using exemplary embodiments in reference to FIGS. 1 and 2, wherein identical reference numerals in the figures refer to identical functional and/or structural features.

For this purpose, in FIG. 1, a diagrammatic representation of a position-sensing device 1 according to the invention in a cooling system A is shown. The system A comprises a number i=4 of adjacent operating regions A1, . . . , A4, namely the so-called cooling segments. In each cooling segment A1, . . . , A4, a slave unit SE1, . . . , SE4 is located at its installation location F1, . . . , F4. In the present embodiment example, the slave units are fans with adjustable rotational speed.

Each operating region A1, . . . , A4 should have, according to the intended use in undisturbed operation of the cooling system A, a respective predetermined physical state, namely a determined operating temperature. Fans are used for controlling the operating temperature in the individual operating regions A1, . . . , A4. An operating function of the fans is their ventilation operation which acts more strongly or more weakly depending on the rotational speed.

By means of this operating function, the physical state, namely the measurement of the thermal energy (analogous to the temperature) in the operating region in question of the control system, can be controlled, wherein, in the operating region A1, . . . , A4 in question, a respective temperature sensor S1, . . . , S4 is provided. Each of these sensors S1, . . . , S4 is accordingly associated with a very specific operating region A1, . . . , A4. With each temperature sensor it is possible to sense a measurement variable (namely the temperature T) proportional to the physical state in this operating region, i.e., in this cooling segment. Furthermore, the position-sensing device 1 comprises an evaluation device 10 in order to determine, upon the activation or changing of the operating function, that is to say the rotational speed of at least one fan, from the change of the temperature over time, the installation location of this slave unit, i.e., of this fan. Naturally, with the represented device, in case of a suitable design of the evaluation device, from the gradients of multiple temperature changes as well, resulting from the rotational speed change of multiple fans, a conclusion can also be derived as to the installation location of one of the fans the rotational speed change of which has been actuated.

Figure 2:
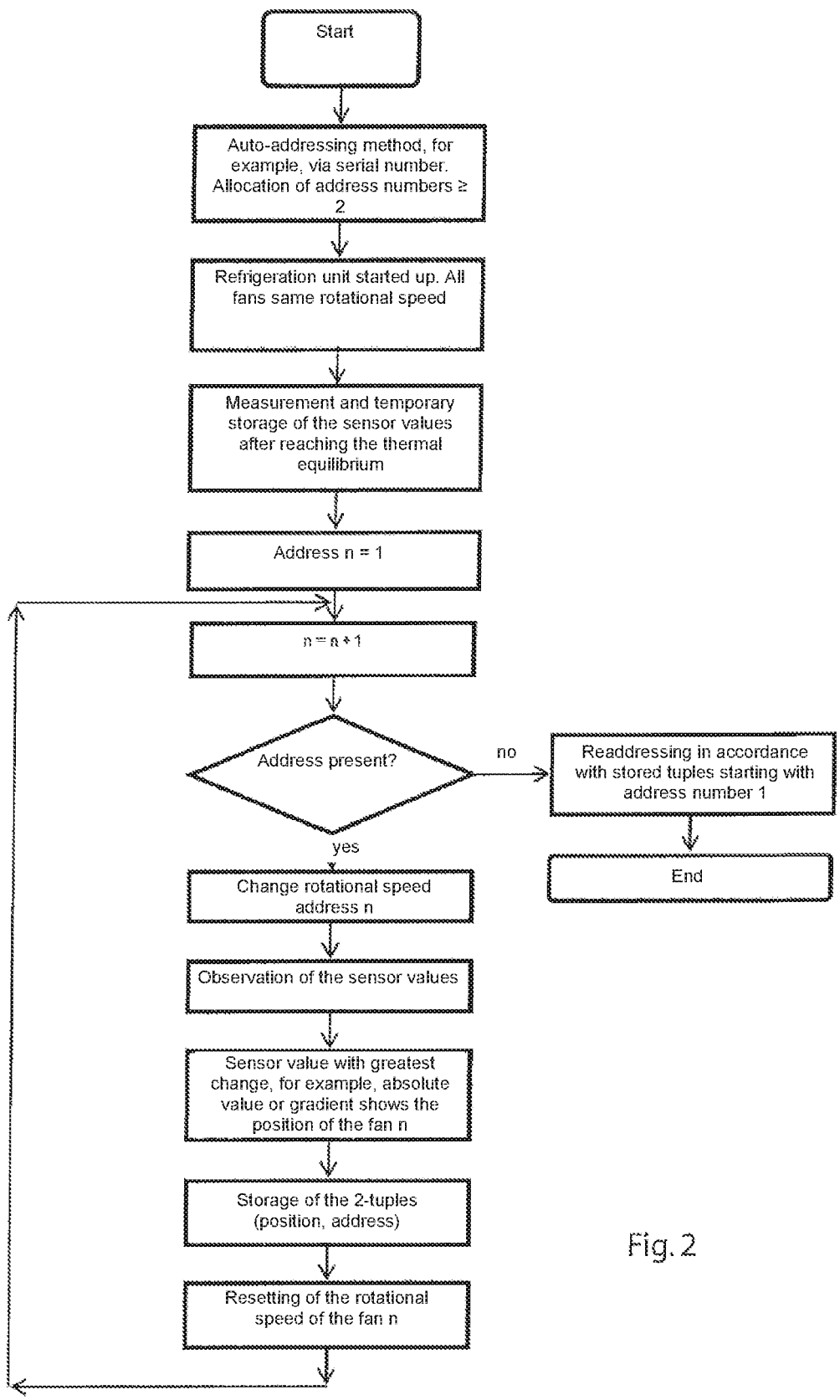
FIG. 2 shows a diagrammatic representation of a flow chart explaining the position-sensing method according to the invention.

In FIG. 2, a flow chart explaining the position-sensing method according to the invention is represented. At the beginning of the method, an auto-addressing method for addressing the fans is carried out. Thereafter, the cooling system A (as shown in FIG. 1) is started up, wherein the 4 fans are activated and operated at a determined rotational speed.

In a subsequent step, the measurement and temporary storage of the sensor values, i.e., measurement values, sensed by means of the sensors occur, in particular after reaching the thermodynamic equilibrium. Then, the addressing method is carried out. If an address of an addressed fan is present, the change of its rotational speed occurs. Subsequently, by means of the evaluation device 10, the change of the measurement values, that is to say sensor values, is sensed. Furthermore, by means of the evaluation device 10, the sensor S1, . . . , S4 with the greatest change (either in the absolute value or in the gradient) is determined. Since, as explained above, a cooling segment A1, . . . , A4 is associated with each sensor S1, . . . , S4, the installation location F1, . . . , F4 can thus concretely be sensed indirectly via the change of the measurement data. The result can be stored, for example, in an allocation table, so that a clear allocation between the position and the address of each fan is obtained. For said fan, after its position has been determined according to the described method, its rotational speed is reset again. As indicated with the recursive arrow of FIG. 2, these steps are repeated until the installation location of all the fans (in the present embodiment example of the 4 fans) is determined.

If the installation location in the system A is represented by position information Pos1, Pos2, . . . , Posi, then, in the end, information is obtained, which associates with each fan SEi of the i fans, a position Posi such as, for example, SE1 at Pos3, SE2 at Pos7, etc.

The invention claimed is:

1. A method for sensing the position of the installation location of slave units in an operating region of a system, comprising a number of adjacent operating regions each having a slave unit, wherein each operating region during operation of the installation has a respective predetermined physical state, for the purpose of which the individual slave units have an operating function for achieving or changing a physical state in the operating region in question of the system, and wherein a respective sensor is provided in the operating region in question in order to sense a measurement variable proportional to the physical state, having the following steps:
   a. allocation or determining of the network address of a slave unit by means of an auto-addressing method;
   b. activating or changing of the operating function of this respective slave unit in order to reach or change the physical state in the operating region in question;
   c. sensing of a detectable state change in the operating units by measuring the respective measurement variables as a function of time by means of the sensors;
   d. identifying a sensor with the greatest measured change of the measurement variable and associating the identified sensor with the network address of the activated slave unit to determine a sensed installation location of the respective slave unit.

2. The method according to claim 1, wherein steps a) to d) are repeated successively, until all the installation locations and thus operating regions of the slave units are associated with the respective network addresses of these slave units.

3. The method according to claim 1, wherein, with each successive allocation of the network addresses (Ni), the network address allocation of the respective next slave unit is increased in each case by the factor "1".

4. The method according to claim 1, wherein the slave units are fans, preferably fans with adjustable rotational speed.

5. The method according to claim 1, wherein, before step b), first all the slave units are activated in order to achieve a determined physical state in the operating regions of the system.

6. The method according to claim 5, wherein, after reaching the determined physical state, the respective measurement variables sensed by the sensors are stored in a memory.

7. The method according to claim 5, wherein, before step b), after reaching the determined physical state in the operating regions of the system, the operating function of the slave unit the installation location of which is to be determined is deactivated again or changed.

8. The method according to claim 5, wherein, before step b), after reaching the determined physical state in the operating regions of the system, all the slave units, except for the slave unit the installation location of which is to be determined, are deactivated again.

9. The method according to claim 1, wherein the measurement variable for sensing the physical state, is the temperature.

10. The method according to claim 1, wherein an identification of each slave unit occurs via a data assignment table containing the individual serial number of each slave unit and the network address assigned to this serial number.

11. A position-sensing device for sensing the installation location of slave units in an operating region of a system having a number of adjacent operating regions each comprising a slave unit, wherein each slave unit has a changeable operating function for achieving or changing a physical state in the operating region of each slave unit of the system, the position-sensing device comprising:
   in each operating region a respective sensor provided in order to sense a measurement variable proportional to the physical state in the respective operating region, and
   an evaluation device provided in the position-sensing device and configured to determine, upon the activation or changing of the operating function of at least one slave unit, a sensor with the greatest measured change of the measurement variable, and configured to associate the determined sensor with the network address of the activated or changed slave unit to determine a sensed installation location of the respective slave unit.

12. The method according to any claim 1, wherein the slave units are fans with adjustable rotational speed.

13. The method according to claim 5, wherein the determined physical state is a state in a thermodynamic equilibrium.

* * * * *